United States Patent
Fairy et al.

(10) Patent No.: US 11,933,458 B1
(45) Date of Patent: Mar. 19, 2024

(54) METHOD AND SYSTEM FOR FILLING TANKS OF HYDROGEN-FUELED VEHICLES

(71) Applicant: L'Air Liquide, Societe Anonyme pour l'Etude et l'Exploitation des Procedes Georges Claude, Paris (FR)

(72) Inventors: Vincent Fairy, Houston, TX (US); Anh Thao Thieu, Jouy-en-Josas (FR); Samuel Trompezinski, Sassenage (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 17/945,987

(22) Filed: Sep. 15, 2022

(51) Int. Cl.
F17C 5/00 (2006.01)
F17C 5/04 (2006.01)

(52) U.S. Cl.
CPC ............... *F17C 5/007* (2013.01); *F17C 5/04* (2013.01); *F17C 2205/0326* (2013.01); *F17C 2221/012* (2013.01); *F17C 2223/0153* (2013.01); *F17C 2227/0135* (2013.01); *F17C 2227/0302* (2013.01); *F17C 2227/0337* (2013.01); *F17C 2250/03* (2013.01); *F17C 2250/043* (2013.01); *F17C 2250/0439* (2013.01);
(Continued)

(58) Field of Classification Search
CPC ...... F17C 5/007; F17C 5/04; F17C 2221/012; F17C 2265/03; F17C 2205/0326; F17C 2223/0153; F17C 2227/0135; F17C 2227/0302; F17C 2227/0337; F17C 2250/03; F17C 2250/043; F17C 2250/0439; F17C 2250/0626; F17C 2250/0636; F17C 2270/0184

USPC .......................................................... 141/11
See application file for complete search history.

(56) References Cited

U.S. PATENT DOCUMENTS

| | | | |
|---|---|---|---|
| 9,528,657 B2 | 12/2016 | Allidieres et al. | |
| 2013/0125568 A1* | 5/2013 | Chalk | F04D 29/584 62/126 |
| 2017/0254479 A1* | 9/2017 | Petersen | F17C 5/06 |

(Continued)

FOREIGN PATENT DOCUMENTS

| WO | WO 2018/012779 | 1/2018 |
|---|---|---|
| WO | WO 2021/138169 | 7/2021 |

OTHER PUBLICATIONS

Daney, et al., "Hydrogen-fuelled vehicle station," Advances in Cryogenic Engineering, vol. 41, 1996.
(Continued)

*Primary Examiner* — Timothy P. Kelly
*Assistant Examiner* — Christopher M Afful
(74) *Attorney, Agent, or Firm* — Justin K. Murray

(57) ABSTRACT

Heat is transferred from a first portion of liquid hydrogen to a flow of a heat transfer fluid at a first heat exchanger through heat exchange with a heat transfer fluid to produce a flow of vaporized hydrogen and a warmed flow of heat transfer fluid. The flow of vaporized hydrogen is combined with a second portion of liquid hydrogen in amounts designed to produce a combined flow with a desired temperature, the combined flow being used to fill one or more buffer vessels. Heat is also transferred at a second heat exchanger from a stream of pressurized hydrogen from the at least one buffer vessel to the cooled flow of heat transfer fluid to produce a cooled flow of pressurized hydrogen that is used to fill tanks of fuel cell electric vehicles.

10 Claims, 7 Drawing Sheets

(52) U.S. Cl.
CPC ................. *F17C 2250/0626* (2013.01); *F17C 2250/0636* (2013.01); *F17C 2265/03* (2013.01); *F17C 2270/0184* (2013.01)

(56) References Cited

U.S. PATENT DOCUMENTS

| | | | |
|---|---|---|---|
| 2019/0331298 A1* | 10/2019 | Thor | ........................ F17C 5/06 |
| 2020/0095113 A1 | 3/2020 | Crispel et al. | |
| 2020/0156924 A1* | 5/2020 | Thieu | ........................ F17C 5/02 |
| 2021/0198095 A1 | 7/2021 | Fairy | |
| 2021/0199244 A1* | 7/2021 | Fairy | ........................ F17C 5/007 |

OTHER PUBLICATIONS

Raman, et al., "A rapid fill hydrogen fuel station for fuel cell buses," 12th World Energy Conference Hydrogen Energy Progress 2, pp. 1629-1642.

* cited by examiner

METHOD AND SYSTEM FOR FILLING TANKS OF HYDROGEN-FUELED VEHICLES

CROSS-REFERENCE TO RELATED APPLICATIONS

None.

BACKGROUND

Field of the Invention

The invention relates to a method and device for filling pressurized hydrogen gas tanks.

More particularly, the invention relates to a device for filling the tanks of fuel cell electric vehicles (FCEV) with hydrogen, the device comprising a liquefied gas source, a transfer circuit in downstream fluid communication with the liquefied gas source and comprising at least one downstream end adapted and configured to be removably connected to a vehicle hydrogen tank to be filled.

Related Art

In order to refuel a fuel cell electric vehicle with high pressure, gaseous hydrogen in a manner consistent with Society of Automotive Engineers (SAE) standard J2601, the temperature of the gaseous hydrogen just upstream of the fuel tank must be controlled to within a relatively narrow, and cold, temperature window, such as between −17.5° C. and −40° C. Also, the pressure ramp rate of the gaseous hydrogen must be controlled according to various physical properties, such as the ambient temperature, the fuel tank category, and the temperature and flow rate of the gaseous hydrogen just upstream of the fuel tank. A pressure control valve, often located just upstream of a heat exchanger for cooling the hydrogen, is used to carry out control of the pressure ramp rate.

Hydrogen gas refuelling stations using liquid hydrogen sources are known.

This type of refuelling station makes it possible to use refrigeration from the liquid hydrogen to produce pre-cooled pressurized hydrogen gas for rapid filling without experiencing an excessive increase in the temperature of the gas in the tank during filling.

For example, Daney, et al. proposed a conceptual refilling station that uses a vaporizer for providing ambient temperature, high pressure gaseous hydrogen that is subsequently cooled prior to being fed to the vehicle tank. Daney, et al., "Hydrogen-fuelled vehicle fuelling station", Advances in Cryogenic Engineering, vol 41, 1996.

Another such station implemented at an urban bus refilling station utilizes a vaporizer that transfers heat from the ambient air to the pumped flow of liquid hydrogen to provide a flow of high pressure, gaseous hydrogen to the vehicle tank. Raman, et al. "A rapid fill hydrogen fuel station for fuel cell buses", 12th World Energy conference Hydrogen energy Progress 2, pp 1629-1642.

One type of hydrogen gas refuelling station that uses a liquid hydrogen source is disclosed by US 2020-0095113 A1. During a vehicle fill mode, a stream of vaporized hydrogen and a stream of liquid hydrogen are mixed using control valves to produce a gaseous hydrogen stream (derived from the mixing) having a predetermined low temperature that is desirable for fast fills. If enough gaseous hydrogen is available from one or more buffer vessels, the gaseous hydrogen used to fill a given vehicle is produced by mixing a stream of the liquid hydrogen and a stream of gaseous hydrogen from the buffer(s). If the requirements of the fill exceed the availability of gaseous hydrogen stored in one or more buffer containers, the stream of gaseous hydrogen is produced by feeding a stream of liquid hydrogen to a vaporizer. In between vehicle fills, the buffer vessel(s) is refilled with gaseous hydrogen produced by mixing the stream of liquid hydrogen and the stream of gaseous hydrogen from the vaporizer. While the temperature of the hydrogen in the buffer vessel(s) immediately following the fill may be colder than ambient, heat leak into the buffer vessel(s) result in heating of the hydrogen, even to ambient temperature. This necessitates the cooling of the gaseous hydrogen to relatively low temperatures (e.g., −40° C.) prior to its entering the vehicle tank so that a fast fill may be achieved.

The cost of gaseous hydrogen that has been used to fill a vehicle (at hydrogen refuelling stations utilizing an on-site liquid hydrogen source) is made up of many cost components, including the production of hydrogen, the distribution of liquid hydrogen, the storage of liquid hydrogen, the vaporization of the liquid hydrogen, and the cooling of the gaseous hydrogen. While the scheme disclosed by US 2020-0095113 is quite satisfactory, there is still a need for a method and system that has increased efficiency in terms of the overall cost of gaseous hydrogen used to fill vehicle tanks.

SUMMARY OF THE INVENTION

There is disclosed a system for filling tanks of fuel cell electric vehicles with pressurized hydrogen, comprising: a liquid hydrogen storage vessel; a liquid hydrogen pump in downstream flow communication from the storage vessel and is adapted and configured to receive a stream of liquid hydrogen from the storage vessel and pump and pressurize the liquid hydrogen stream to produce a stream of pressurized hydrogen; a first heat exchanger having a warming circuit that is adapted and configured to receive and vaporize a first portion of the pressurized hydrogen stream therein to produce a vaporized hydrogen stream and also having a cooling circuit; a bypass circuit adapted and configured to receive a second portion of the pressurized hydrogen stream from the liquid hydrogen pump; a vaporized hydrogen circuit adapted and configured to receive the vaporized hydrogen stream; a buffer vessel feed conduit adapted and configured to receive the vaporized hydrogen stream from the vaporized hydrogen circuit and the second portion of the pressurized hydrogen stream from the bypass circuit to form a combined stream; a first temperature control valve adapted and configured to control a flow rate of the vaporized hydrogen stream in the vaporized hydrogen circuit; a second temperature control valve adapted and configured to control a flow rate of the second portion in the bypass circuit; at least one buffer vessel adapted and configured to receive and store the combined stream from said buffer vessel feed conduit until a vehicle tank fill is requested; a second heat exchanger having a cooling circuit that is adapted and configured to receive and cool the combined stream from the buffer vessel feed conduit and/or a stream of pressurized hydrogen from the at least one buffer vessel to produce a cooled stream of pressurized hydrogen, the second heat exchanger also having a warming circuit; a filling circuit comprised of, in flow order, the cooling circuit of the second heat exchanger and at least one filling dispenser that is adapted and configured to engage with a fuel cell electric vehicle so as to allow a tank thereof be filled with the cooled stream of pressurized hydrogen; a temperature sensor disposed in the buffer vessel feed conduit that is adapted and configured to measure a temperature of the combined stream; and a heat exchange fluid loop that is comprised of, in flow order, a surge vessel containing a main heat transfer fluid, a main heat transfer fluid pump adapted and configured to pump the main heat transfer fluid through the heat exchange fluid loop, the cooling circuit of the first heat exchanger, the warming circuit of the second heat exchanger, and the surge vessel. The first heat exchanger is adapted and configured to exchange heat between the relatively warmer main heat transfer fluid with the relatively cooler first portion of the pressurized hydrogen stream to produce the vaporized hydrogen stream and cooled stream of main heat transfer fluid. The second heat exchanger is adapted and configured to exchange heat between, on one hand, the relatively warmer combined stream and/or the relatively warmer stream of pressurized hydrogen from the at least one buffer vessel, and on the other hand, the relatively cooler cooled stream of main heat transfer fluid. The first and second temperature control valves control the flow rate of the vaporized hydrogen stream and the second portion, respectively, based upon a temperature measured by said temperature sensor.

There is also disclosed a method for filling tanks of fuel cell electric vehicles with pressurized hydrogen. It includes the following steps. The above-disclosed system is provided. Liquid hydrogen is pumped from the liquid hydrogen storage vessel with the liquid hydrogen pump to produce a stream of pressurized hydrogen. A flow of main heat transfer fluid is pumped, with the main heat transfer fluid pump, in the heat exchange fluid loop. The stream of pressurized hydrogen is divided into first and second portions. The first portion is vaporized in the warming circuit of the first heat exchanger and cooling the flow of main heat transfer fluid in the cooling circuit of the first heat exchanger through heat exchange therebetween to produce a stream of vaporized hydrogen and cooled flow of main heat transfer fluid. The vaporized hydrogen stream is received into the vaporized hydrogen circuit. The second portion is received into the bypass circuit. A combined stream comprised of the vaporized hydrogen stream and the second portion from the vaporized hydrogen circuit is received into the buffer vessel feed conduit. The combined stream until a fill of a vehicle tank is requested is received and stored in the at least one buffer vessel. When a vehicle tank fill is requested, the combined stream from the buffer vessel feed conduit and/or a stream of pressurized hydrogen from the at least one buffer vessel is cooled in the cooling circuit of the second heat exchanger and the cooled flow of main heat transfer fluid is warmed in the warming circuit of the second heat exchanger through heat exchange therebetween to produce a cooled stream of pressurized hydrogen and warmed flow of main heat transfer fluid. A temperature of the combined stream in the buffer vessel feed conduit is measured with the temperature sensor. The flow rates or pressures of the vaporized hydrogen stream and the second portion are controlled with the first and second temperature control valves, respectively, based upon a temperature sensed by the temperature sensor. The vehicle tank is filled with the cooled stream of pressurized hydrogen.

The system and/or method may include one or more of the following aspects:

the at least one filling dispenser comprises first and second filling dispensers each one of which is adapted and configured to engage with a respective fuel cell electric vehicle so as to allow an associated tank thereof be filled with pressurized hydrogen, the filling circuit branching into a first split-stream adapted and configured to feed pressurized hydrogen from the at least one buffer vessel to the first filling dispenser and a second split-stream adapted and configured to feed pressurized hydrogen from the at least one buffer vessel to the second filling dispenser.

the system further includes an auxiliary heat transfer pump and an auxiliary heat exchanger that comprises a warming circuit that is in flow communication between the warming circuit of said first heat exchanger and the buffer vessel feed conduit, wherein: an auxiliary heat transfer circuit is formed from the cooling circuit of the auxiliary heat exchanger and the auxiliary heat transfer pump; the auxiliary heat transfer circuit is adapted and configured to circulate an auxiliary heat transfer fluid from the auxiliary heat transfer pump, through the cooling circuit of the auxiliary heat transfer circuit and back to the auxiliary heat transfer pump; and the auxiliary heat exchanger is a tube-in-tube heat exchanger comprising an inner tube concentrically disposed within an outer tube, the warming circuit of the auxiliary heat exchanger being the inner tube and the cooling circuit of the auxiliary heat exchanger being the outer tube.

the system further comprises a pressure building circuit in flow communication between a liquid hydrogen storage area of the storage vessel and a headspace of the storage vessel, the pressure building circuit being adapted and configured to receive a stream of liquid hydrogen from the liquid hydrogen space of the storage vessel, vaporize, in a second warming circuit of said first heat exchanger, the stream of liquid hydrogen received from the storage vessel through heat exchange with a mass of the heat exchanger, and return the vaporized liquid hydrogen to the headspace so as to build a pressure therein.

The system further comprises a boil-off gas venting circuit in flow communication between a headspace of the storage vessel and a an ambient atmosphere of the system, the boil off gas venting circuit comprising a first end that is in downstream flow communication with the headspace, a second end that is selectively open to the ambient atmosphere, and a second warming circuit of the first heat exchanger in between the first and second ends, the boil off gas vent circuit being adapted and configured to receive boil off gas from the headspace, warm the received boil off gas in the second warming circuit through heat exchange with a mass of the first heat exchanger, and vent the warmed boil off gas to the ambient atmosphere via the second end.

The system further comprises: a main heat transfer line in fluid communication between the main heat transfer fluid pump and the cooling circuit of the first heat exchanger; a main heat transfer fluid bypass loop having a first end in downstream fluid communication with the main heat transfer fluid line, a second end in upstream fluid communication with the main heat transfer fluid line, and a heat exchanger section therebetween; and a fan heater adapted and configured to blow ambient air upon the heat exchange section to warm a pumped flow of the main transfer fluid before the pumped flow of the main heat transfer fluid is cooled at the first heat exchanger.

the first heat exchanger comprises a mass of metal formed by high-temperature casting in liquid form around the warming and cooling circuits thereof.

The system further comprises: a pressure sensor and a temperature sensor each disposed in the filling circuit that are adapted and configured to measure a pressure and a temperature, respectively, of the cooled stream of pressurized hydrogen received from the second heat exchanger; and a pressure control valve disposed in the filling circuit that is adapted and configured to control a pressure of the cooled stream of pressurized hydrogen used to fill a tank of a fuel cell electric vehicle, wherein operation of the pressure control valve is based upon the pressure and temperature measured by the pressure and temperature sensors.

The method further comprising the steps of: pumping, with said auxiliary heat transfer pump, an auxiliary heat transfer fluid in an auxiliary heat exchange circuit to produce a recirculating flow of the auxiliary heat transfer fluid; and warming, in the warming circuit of said auxiliary heat exchanger, the stream of vaporized hydrogen and cooling, in the cooling circuit of the auxiliary heat exchanger, the recirculating flow of the auxiliary heat transfer fluid through heat exchange between the stream of vaporized hydrogen and the recirculating flow of the auxiliary heat transfer fluid.

The method further comprises the steps of: feeding a stream of liquid hydrogen from the storage vessel to a second warming circuit of the first heat exchanger; vaporizing the fed stream of liquid hydrogen in the second warming circuit of the first heat exchanger through heat exchange with a mass of the first heat exchanger to produce a stream of vaporized liquid hydrogen; and returning the stream of vaporized liquid hydrogen to a headspace of the storage vessel thereby increasing a pressure thereof.

The method further comprises the steps of: feeding a stream of gaseous hydrogen from a headspace of the storage vessel to a second warming circuit of the first heat exchanger; and vaporizing the fed stream of liquid hydrogen in a second warming circuit of the first heat exchanger, and venting the vaporized liquid hydrogen to the ambient atmosphere.

BRIEF DESCRIPTION OF THE FIGURES

Other characteristic features and advantages will emerge upon reading the following description, with reference to the figures in which.

Figure 1:
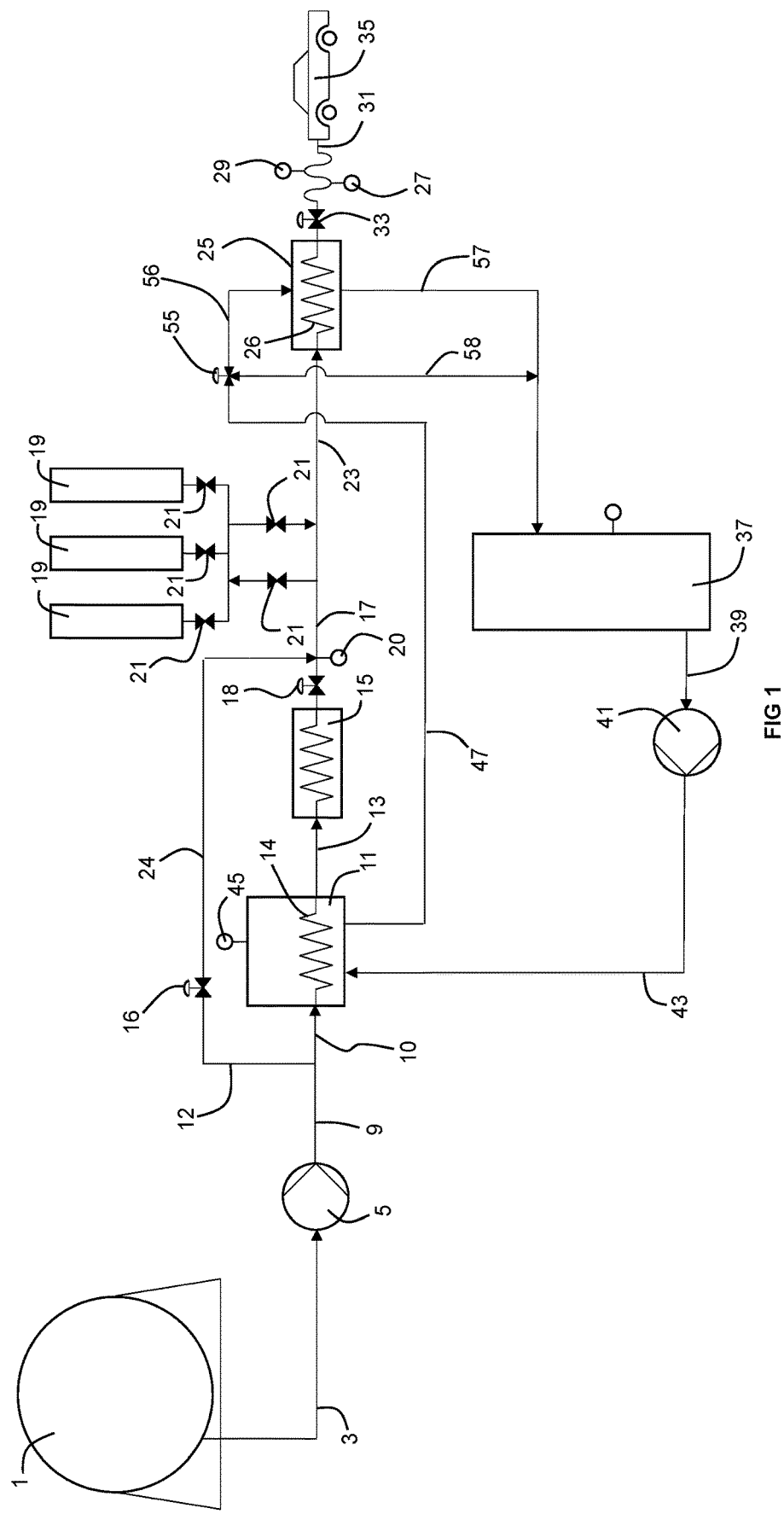
FIG. 1 is a schematic view of an embodiment of the inventive station and method of the invention.

LEGEND liquid hydrogen source 1
liquid hydrogen feed line 3
liquid hydrogen pump 5
pressurized hydrogen stream 9
second portion of pressurized hydrogen 10
first heat exchanger 11
second portion of pressurized hydrogen 12
vaporized hydrogen circuit 13
warming circuit 14
auxiliary heat exchanger 15
second temperature control valve 16
buffer vessel feed conduit 17
first temperature control valve 18
temperature sensor 20
buffer vessel 19
valve 21
pressurized hydrogen stream 23
first pressurized hydrogen sub stream 23'
second pressurized hydrogen sub stream 23"
bypass conduit 24
second heat exchanger 25
cooling circuit 26
first of two second heat exchangers 25'
second of two second heat exchangers 25"
pressure sensor 27
pressure sensor 27'
pressure sensor 27"
temperature sensor 29
temperature sensor 29
temperature sensor 29
filling dispenser 31
filling dispenser 31'
filling dispenser 31"
pressure control valve 33
fuel cell electric vehicle 35
fuel cell electric vehicle 35'
fuel cell electric vehicle 35"
surge vessel 37
stream of heat transfer fluid 39
main HTF pump 41
pumped stream of main HTF 43
temperature sensor 45
cooled stream of main HTF 47
auxiliary HTF pump 49
first split-stream of main HTF 53'
second split-stream of main HTF 53"
three-way flow control valve 55
main flow of cooled main HTF 56
warmed second stream of heat transfer fluid 57
warmed first split-stream of heat transfer fluid 57'
warmed second split-stream of heat transfer fluid 57"
bypass flow of cooled main HTF 58
first bypass flow of cooled main HTF 58'
second bypass flow of cooled main HTF 58"
three-way flow control valve 67
auxiliary heat transfer fluid pump 71
pumped stream of auxiliary heat transfer fluid 73
warmed stream of auxiliary heat transfer fluid 75
pressure building circuit liquid hydrogen feed line 77
control valve 79
temperature sensor 81
gaseous hydrogen line 83
headspace feed line 85
control valve 87
vent valve 89
vent 91
gaseous hydrogen return line 93
3-way flow control valve 95'
3-way flow control valve 95"
main HTF bypass flow 97
fan heater 99

DETAILED DESCRIPTION OF THE INVENTION

In known filling methods utilizing liquid hydrogen sources such as U.S. Pat. No. 11,155,459, a stream of liquid hydrogen is pumped to very high pressures above its critical pressure. The resulting very cold, pressurized fluid is split into two streams. The first stream is heated at a "vaporizer" in contact with the ambient atmosphere. We used the term "vaporizer" broadly because the cold, pressurized fluid may be in a dense liquid state (above its critical pressure) or in the supercritical state and it is even conceivable that it might be in the gaseous state. The second stream bypasses the vaporizer and is recombined, in a controlled manner, with the vaporized first stream in order to reach a predetermined temperature of the combined flue. While remaining a quite satisfactory method of filling FCEV tanks from liquid hydrogen sources, the available refrigeration (i.e., frigories or negative heat) of the cold, pressurized fluid in the first stream is thus lost to the ambient atmosphere at the vaporizer. Depending upon the flow rate demanded at the dispenser(s) used to fill one or more FCEV tanks, the pressurized fluid from the vaporizer may be used to directly fill the tanks(s) and optionally supplemented with amounts of hydrogen from one or more buffer vessels or it may instead by stored in the one or more buffer vessels and later used to accomplish a fill of one or more tanks. Given enough time and due to heat leak at the one or more buffer vessels, the temperature of the heated pressurized fluid, which is often still at very low temperatures, is increased to ambient temperature. In order to efficiently fill the one or more tanks, such ambient temperature fluid must be cooled with an external refrigeration source so that the Joule-Thomson heating (at temperatures above the inversion temperature of hydrogen) may be accommodated without over pressurizing the tank(s).

In order to avoid wasting the refrigeration available from the pressurized hydrogen at the vaporizer that is realized with such a technique, that refrigeration (i.e., frigories or negative heat) is instead captured through heat exchange with a main heat transfer fluid (main HTF) in practice of the invention. Those captured frigories are then used to cool the pressurized hydrogen that is used to fill the vehicle tank(s) through heat exchange between the main HTF and the pressurized hydrogen. This provides increased efficiency in comparison to conventional techniques that require an external source of refrigeration for cool the pressurized hydrogen.

In the invention, a heat exchange fluid loop includes, in flow order, a surge vessel containing a main HTF, a main HTF pump, a cooling circuit of a first heat exchanger, a warming circuit of a second heat exchanger, and back to the surge vessel. Each of the first and second heat exchangers includes a warming circuit and a cooling circuit. Liquid hydrogen is pumped with a liquid hydrogen pump and divided into first and second portions. The first portion is fed to the warming circuit of the first heat exchanger while the main HTF is pumped with the main HTF pump from a surge vessel to the cooling circuit of the first heat exchanger and through the loop. At the first heat exchanger, the first portion of pumped hydrogen is warmed through heat exchange with the pumped main HTF to produced vaporized hydrogen, that is received into a vaporized hydrogen circuit, and cooled main HTF. A second portion of pumped hydrogen is received into a bypass circuit that bypasses the first heat exchanger. The vaporized hydrogen, corresponding to the first portion, is combined with the second portion of pumped liquid hydrogen in amounts controlled by a temperature control valves associated with the vaporized hydrogen circuit and the bypass circuit based upon a temperature sensor disposed in a buffer vessel feed conduit that receives the combined streams. The combined stream is received and stored in one or more buffer vessels until a request for a fill of a vehicle tank. Pressurized hydrogen from either the one or more buffer vessels or directly from the buffer vessel feed conduit is fed to the cooling circuit of the second heat exchanger while the cooled main HTF (obtained from the cooling circuit of the first heat exchanger) is fed to the warming circuit of the second heat exchanger. At the second heat exchanger, the warmed pressurized hydrogen is cooled through heat exchanger with the cooled main HTF to produce cooled pressurized hydrogen that is used to fill one more tanks of a FCEV and warmed main HTF. The warmed main HTF is then returned to the surge vessel.

Optionally, one or more temperature control schemes may be utilized in practice of the invention.

In order to ensure that the main HTF is not over-cooled through heat transfer with the mass of the first heat exchanger and the frigories of the pumped liquid hydrogen, at least a portion of the flow of the pumped main HTF may be warmed, as necessary, in a bypass loop before it is directed to the cooling circuit of the first heat exchanger.

In order to ensure that a temperature of the vaporized hydrogen exiting the first heat exchanger is not too cold, the pressurized hydrogen exiting the first heat exchanger may be further warmed in an auxiliary heat exchanger in flow communication between the first heat exchanger and the one or more buffer vessels. In this case, the vaporized hydrogen may be subsequently warmed through heat exchange with an auxiliary heat transfer fluid (auxiliary HTR) that flows through an auxiliary heat transfer circuit. Whether the auxiliary HTF and the main HTF is the same or different type of heat exchanger fluid, the heat exchange circuit through which the main HTF flows is separate from the auxiliary heat exchange circuit.

In order to ensure that the first heat exchanger is not too warm, the mass of the first heat exchanger may be cooled down in one or both of two ways. First, a pressure building circuit of the storage vessel may extend through an additional cooling circuit of the first heat exchanger. In other words, the additional cooling circuit is used as the heat exchanger section of a typical pressure building circuit. Second, a boil-off gas vent line may extend through the additional cooling circuit of the first heat exchanger.

In order to ensure that the pressurized hydrogen, obtained from the at least one buffer vessel and/or the buffer vessel feed conduit, that is used to fill the tank of a FCEV is sufficiently cold, a flow control valve may be used to split a flow of the cooled main HTF from the first heat exchanger into a stream that flows through the warming circuit of the second heat exchanger and a stream that bypasses that warming circuit. If more cooling is needed, more of the flow of the cooled main HTF is allowed to flow through the cooling circuit of the second heat exchanger and less bypasses the second heat exchanger. If less cooling is needed, less of that flow is allowed to flow through the cooling circuit and more of it is allowed to bypass the second heat exchanger.

We will now describe particular embodiments.

As best shown in FIG. 1, a stream of liquid hydrogen 3 from a liquid hydrogen storage vessel 1 is pumped with a liquid hydrogen pump 5 to provide a stream of pressurized hydrogen 9. The stream of pressurized hydrogen 9 is divided into a stream made up of a first portion of the pressurized hydrogen 10, which is received into a warming circuit 14 of a first heat exchanger 11, and a stream of a second portion of the pressurized hydrogen 12, which is received into a bypass circuit 24. The hydrogen of stream 10 is vaporized in the warming circuit 14 and received into a vaporized hydrogen circuit 13. On the other hand, the hydrogen of stream 12 is not vaporized because the bypass circuit 24 bypasses the first heat exchanger 11. In the event that the hydrogen in the vaporized hydrogen conduit 13 is too cold, it may optionally be warmed in an auxiliary heat exchanger 15. The vaporized hydrogen in the vaporized hydrogen circuit 13 and the liquid hydrogen in the bypass circuit 24 are combined and received, as a combined stream, in buffer vessel feed conduit 17.

A temperature sensor 20 is disposed in the buffer vessel feed conduit 17 and is adapted and configured to measure a temperature of the combined stream therein. The temperature of the combined stream is controlled as follows. The flow rates or pressures of vaporized hydrogen in vaporized hydrogen conduit 13 and liquid hydrogen in bypass conduit 24 are controlled by first and second temperature control valves 18, 16, respectively, based upon the temperature measured by temperature sensor 20. If the temperature of the combined stream in the buffer vessel feed conduit 17 is too cold, the flow rate of the stream of liquid hydrogen in the bypass conduit 24 is decreased by the second temperature control valve 16 while the flow rate of the stream of vaporized hydrogen in vaporized hydrogen conduit 13 is increased. Conversely, if the temperature of the combined stream in the buffer vessel feed conduit 17 is too warm, the flow rate of the stream of liquid hydrogen in the bypass conduit 24 is increased by the second temperature control valve 16 while the flow rate of the stream of vaporized hydrogen in vaporized hydrogen conduit 13 is decreased.

The hydrogen of the combined stream in the buffer vessel feed conduit 13 may be fed to one or more buffer vessels 19 for storage until a vehicle tank fill is requested, in which case hydrogen from the one or more buffer vessels 19 is fed towards a second heat exchanger 25 as a pressurized hydrogen stream 23. Alternatively, the hydrogen of the combined stream in the buffer vessel feed conduit 13 may bypass the one or more buffer vessels 19 and be fed towards the second heat exchanger 25 as the pressurized hydrogen stream 23. Whether the hydrogen of the combined stream is first fed to the one or more buffer vessels 21 and later fed towards the second heat exchanger 25 or is instead fed directly towards the second heat exchanger 25, such alternative flow configurations are controlled by opening or closing, as appropriates, one or more valve 21 constituting a set of valves.

A stream of main HTF 39 is pumped with a main HTF pump 41 to produce a pumped stream of main HTF 43. The pumped stream of main HTF 43 is fed to a cooling circuit of the first heat exchanger 11 to produce a cooled stream of main HTF 47.

Optionally, a temperature representative of a temperature of the material that the first heat exchanger 11 is comprised of is measured with a temperature sensor 45. The temperature sensor 45 may measure a skin temperature of the first heat exchanger 11. Alternatively, it may be embedded in the material that the first heat exchanger 11 is made of. Alternatively, it may measure a temperature of the main HTF inside the first heat exchanger 11 or a temperature of the main HTF at an outlet of the cooling circuit of the first heat exchanger. A controller (such as a programmable logic controller or computer) controls a speed of the main HTF pump 41 (such as by increasing or decreasing the speed of a variable frequency drive of the pump 41) based upon the temperature measured by the temperature sensor 45 and a predetermined set point temperature or range of set point temperatures sought to be achieved.

The frigories from the pumped stream of liquid hydrogen 9 that were captured by the pumped stream of main HTF 43 are at least partially returned to the hydrogen that is used to fill the FCEV tanks. To achieve this, the stream of pressurized hydrogen 23 (from the one of more buffer vessels 19 or directly from the buffer vessel feed conduit 17 via the set of valves 21) is fed to a cooling circuit of the second heat exchanger 25 where it is cooled through heat exchange with at least a portion of the cooled stream of main HTF 47 that is fed to a warming circuit of a second heat exchanger 25. The thus-cooled stream of pressurized hydrogen is used to fill the tank of a FCEV via a filling dispenser 31. The thus-warmed stream of main HTF 57 is subsequently returned to the surge vessel 37.

Optionally, a temperature of the hydrogen (that is used to fill the FCEV tank) is measured with a temperature sensor 29. A controller (such as a programmable logic controller or computer that is the same as or different from the one controlling the main HTF pump) controls three-way flow control valve 55 to allocate the flow of the cooled main HTF 23 between a flow of main HTF 56 fed to the warming circuit of the second heat exchanger 25 and a bypass flow of main HTF 58. This control is based upon the temperature measured by temperature sensor 29 and a predetermined set point temperature or range of set point temperatures sought to be achieved. The bypass flow of cooled main HTF 58 and warmed stream of main HTF 57 are combined and returned to the surge vessel 37.

Optionally, a pressure of the cooled pressurized hydrogen from the second heat exchanger 25 is controlled with a pressure control valve 33 based upon the temperature and pressure of the hydrogen (used to fill the tank of the FCEV 35) that is measured with temperature sensor 29 and a pressure sensor 27, respectively. The pressure control valve 33 is controlled by a controller (such as a programmable logic controller or computer) that is coded with a filing algorithm such as one that is consistent with the SAE standard J2601 for filling light duty vehicles.

Any type of heat exchanger known in the field of heat transfer involving cryogenic fluids may be used for the first heat exchanger 11. Typically, the first heat exchanger is a refrigeration hold-over medium such as that described in U.S. Pat. No. 9,258,657, the contents of which are incorporated by reference in their entirety. The refrigeration hold-over medium is made of a mass of metal such as aluminum, stainless steel, copper, or lead. It has a sufficiently high specific heat capacity and thermal conductivity, enabling it to easily transfer heat (accept frigories) and to store a satisfactory amount of refrigeration (frigories). More particularly; the refrigeration hold-over medium typically has a specific heat per unit mass (density X specific heat at constant pressure) of between 2000 and 4000 kJ/m$^3$K and a thermal conductivity of between 150 and 400 W/mK. Typically, the refrigeration hold-over medium is formed as a mass of metal formed by high-temperature casting in liquid form around the warming and cooling circuits in order to increase the thermal contact therebetween. The distance between adjacent portions of the warming and cooling circuits of the first heat exchanger 11 may be as low as 1 or more millimetres, preferably at least 5 mm. This allows an amount of mass in between the warming circuits that yields a satisfactorily high enough capacity for storage of frigories to be accepted by the pumped stream of main HTF 43.

Figure 2:
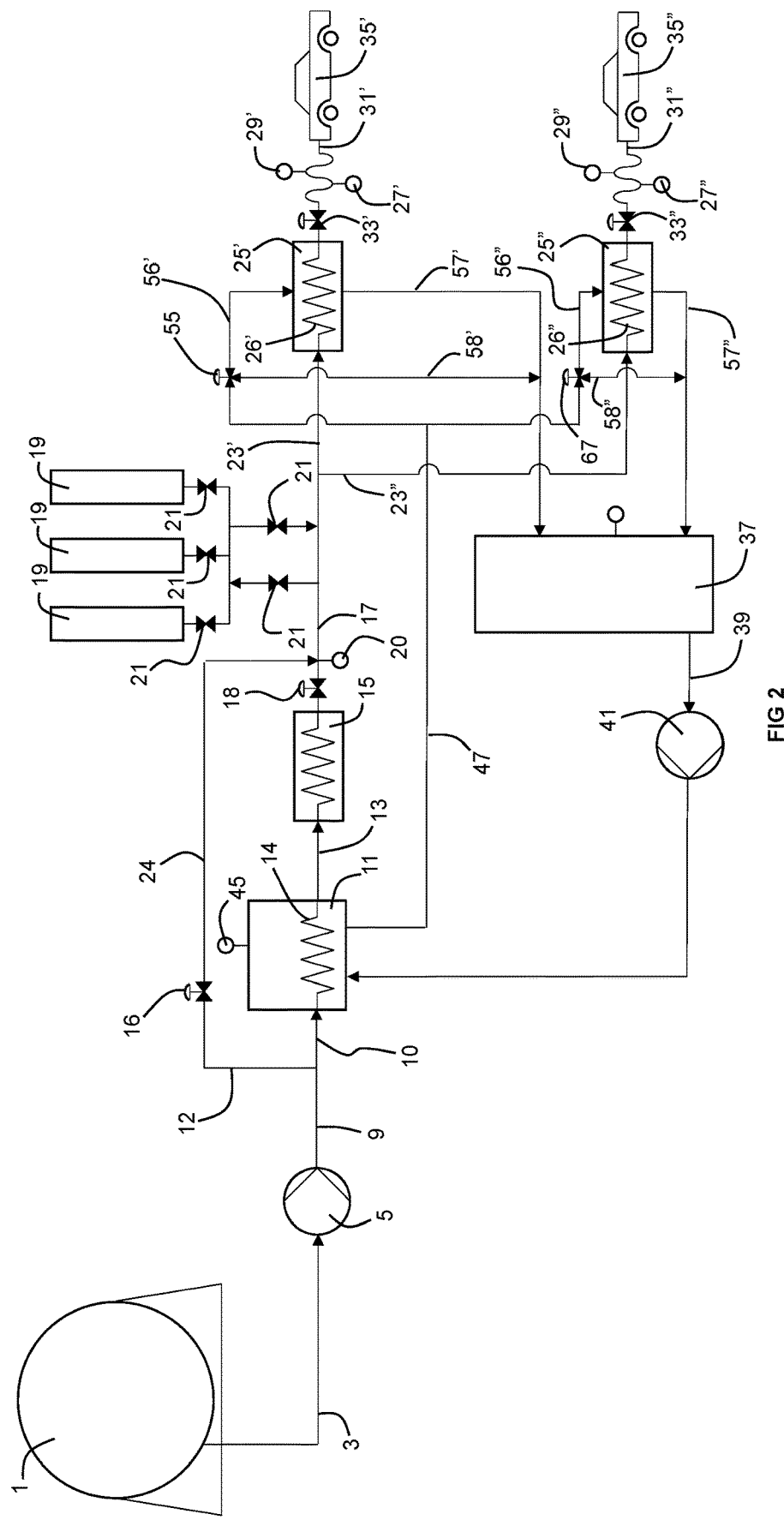
FIG. 2 is a schematic view of a variant of the station and method of FIG. 1.

As best illustrated in FIG. 2, the pressurized hydrogen stream 23 may be split into first and second pressurized hydrogen sub streams 23', 23" At the first of two second heat exchangers 25', the first pressurized hydrogen sub stream 23' is cooled in a cooling circuit thereof. Similarly, at the second of two second heat exchangers 25", the second pressurized hydrogen sub stream 23" is also cooled in cooling circuit thereof. The cooled stream of main HTF 47 is correspondingly split into first and second split-streams of main HTF 53', 53", respectively, with a three-way valve flow control 67 that is controlled with a controller (such as a programmable logic controller or computer that is the same as or different from the one controlling main HTF pump 41). After being cooled at a corresponding one of the two second heat exchangers 25', 25", the two flows of pressurized hydrogen derived from sub streams 23', 23" are used to fill corresponding tanks of FCEVs 35', 35".

Figure 6:
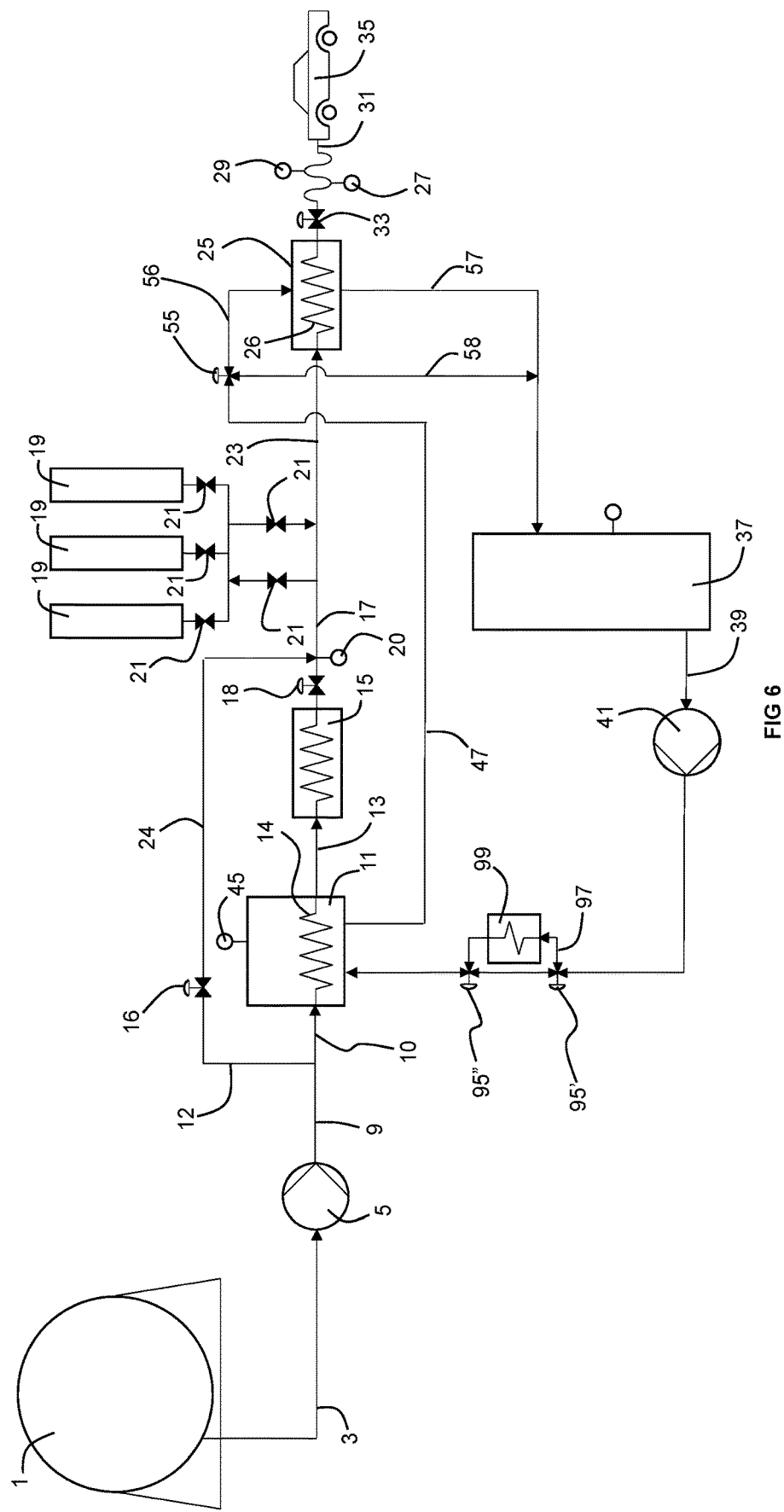
FIG. 6 is a schematic view of a variant of the station and method of FIG. 1.

The embodiment of FIGS. 2 and 6 may be used to simultaneously fill two tanks of FCEVs. For example, one of the buffer vessels 19 at one pressure may provide pressurized hydrogen used to fill the tank of the first FCEV 35' while another of the buffer vessels 19 at a different pressure may provide hydrogen used to fill the tank of the second FCEV 35". Skilled artisans will recognize that the illustration of the set of valves 21, one or more buffer vessels 19, and the first and second pressurized hydrogen sub streams 23', 23' is a simplification. The lines leading away from the buffer vessels 19 may be branched in order to achieve this simultaneous filling and need not be restricted to the simply illustrated scheme in which a single manifold handles a single flow from the buffer vessels 19.

Optionally, a temperature of the hydrogen (that is used to fill the FCEV tank) is measured with a temperature sensor 29' associated with a first FCEV 35' and a temperature of the hydrogen is measured with a temperature sensor 29" associated with a second FCEV 35". A controller (such as a programmable logic controller or computer that is the same as or different from the one controlling the main HTF pump) controls three-way flow control valve 55 to allocate the flow of the cooled main HTF 23 between a flow of main HTF 56 fed to the warming circuit of the second heat exchanger 25 and a bypass flow of main HTF 58. This control is based upon the temperature measured by temperature sensor 29 and a predetermined set point temperature or range of set point temperatures sought to be achieved. The bypass flow of cooled main HTF 58 and warmed stream of main HTF 57 are combined and returned to the surge vessel 37.

Figure 3:
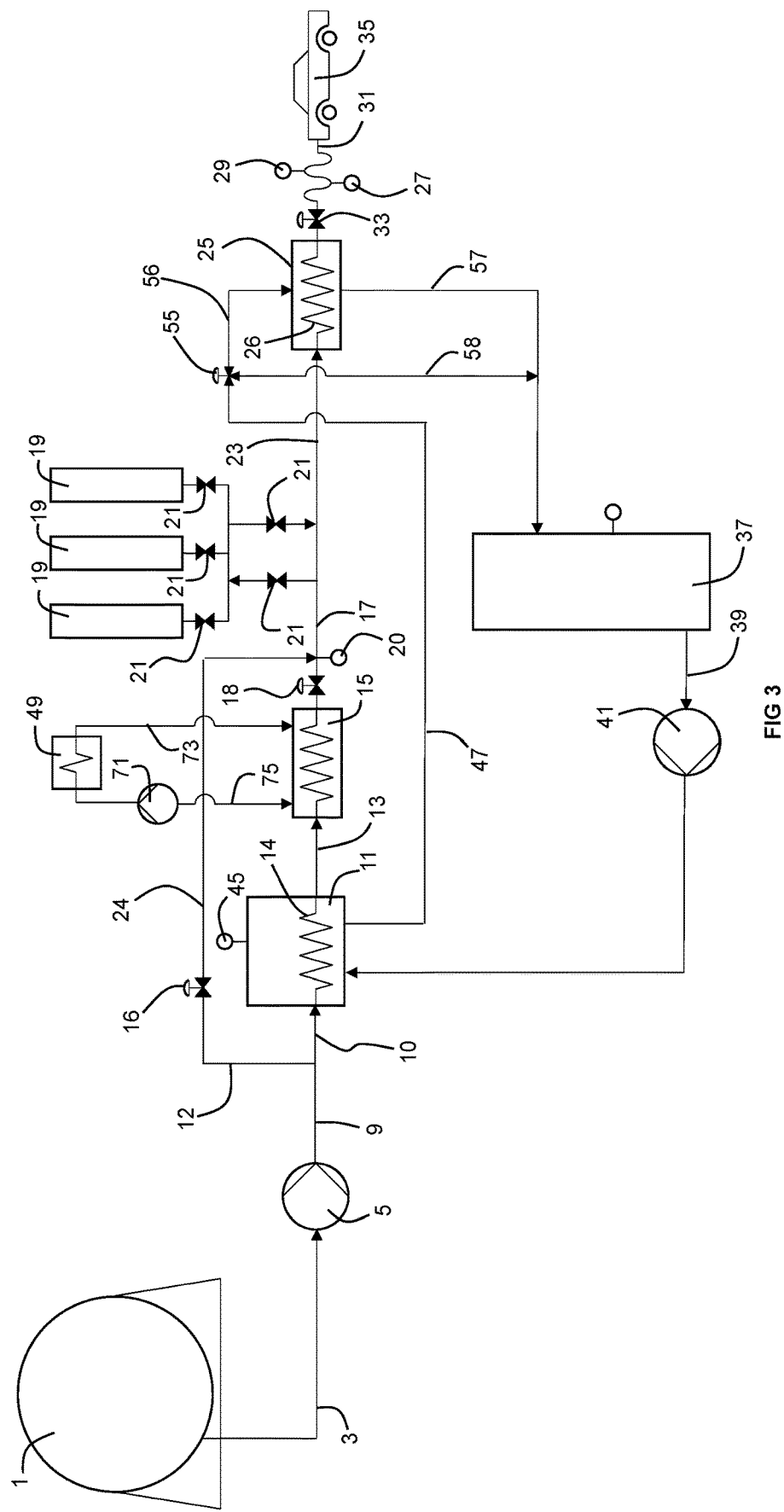
FIG. 3 is a schematic view of a variant of the station and method of FIG. 1.

As best shown in FIG. 3, if warming at the first heat exchanger 11 is insufficient to reach a desired temperature, the stream of vaporized hydrogen stream in vaporized hydrogen circuit 13, obtained from the first heat exchanger 11, may be further warmed at an auxiliary heat exchanger 15. The stream of vaporized hydrogen in circuit 13 is fed to a warming circuit of auxiliary heat exchanger 15 to produce a further warmed stream of vaporized hydrogen that is combined with the stream of liquid hydrogen from the bypass circuit 24. Flowing through a cooling circuit of the auxiliary heat exchanger 15 is an auxiliary heat exchanger fluid (auxiliary HTF). The auxiliary HTF is pumped with an auxiliary HTF pump 49, warmed at a heater 51, fed to the cooling circuit of the auxiliary heat exchanger 15, and returned to the inlet of the auxiliary HTF pump 49. Non-limiting examples for the heater 51 include electrical heaters or radiators warmed by an ambient air fan such as that disclosed in WO 2021138169 A1). Operation of the auxiliary HTF pump 49 is controlled by a controller (such as a programmable logic controller or computer that is the same as or different from the one controlling the main HTF pump) based upon a temperature measured by temperature sensor 52 and a predetermined temperature set point or range of temperature set points. Temperature sensor 52 may measure a skin temperature of the auxiliary heat exchanger 15, a temperature of the auxiliary HTF inside the cooling circuit of the second heat exchanger 15, or a temperature of the auxiliary HTF at an outlet of the cooling circuit of the second heat exchanger 15. While the auxiliary heat exchanger may have any configuration known in the field of heat transfer involving cryogenic fluids, typically it is a tube-in-tube heat exchanger. The warming circuit is the inner tube which is concentrically disposed within an outer tube. The cooling circuit is formed by the annular space in between the inner and outer tubes.

Figure 4:
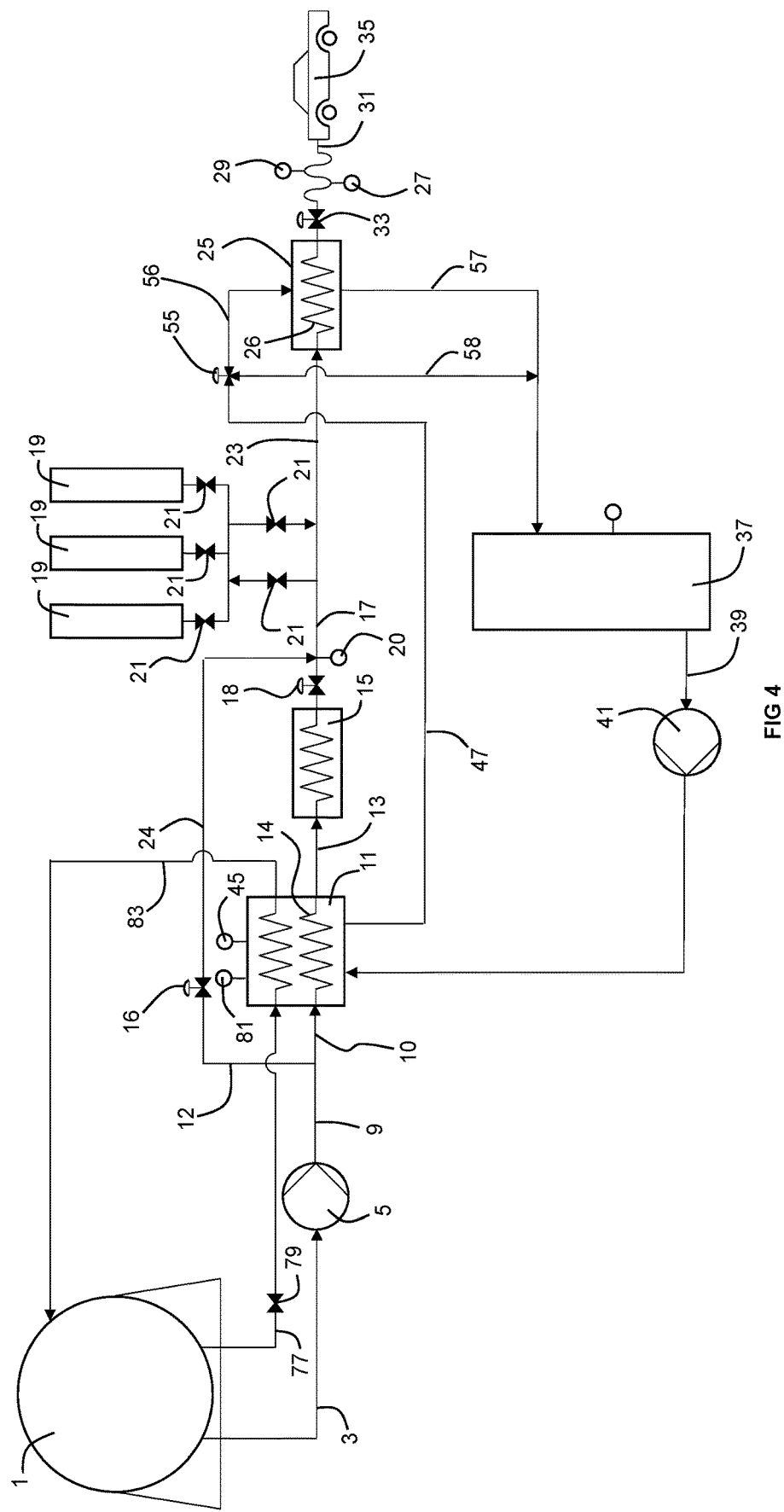
FIG. 4 is a schematic view of a variant of the station and method of FIG. 1.

As best illustrated in FIG. 4, at least part of a pressure building circuit for the storage vessel 1 extends through a second warming circuit of the first heat exchanger 11. A valve 79 may be opened to allow amounts of liquid hydrogen from the storage vessel 1 to flow to the second warming circuit via a pressure building circuit liquid hydrogen feed line 77. The liquid hydrogen is vaporized in the warming circuit and returned to a headspace of the storage vessel 11 via gaseous hydrogen line 83, thereby building pressure therein. This may be especially useful when the first heat exchanger 11 is a refrigeration hold-over medium as described above.

Figure 5:
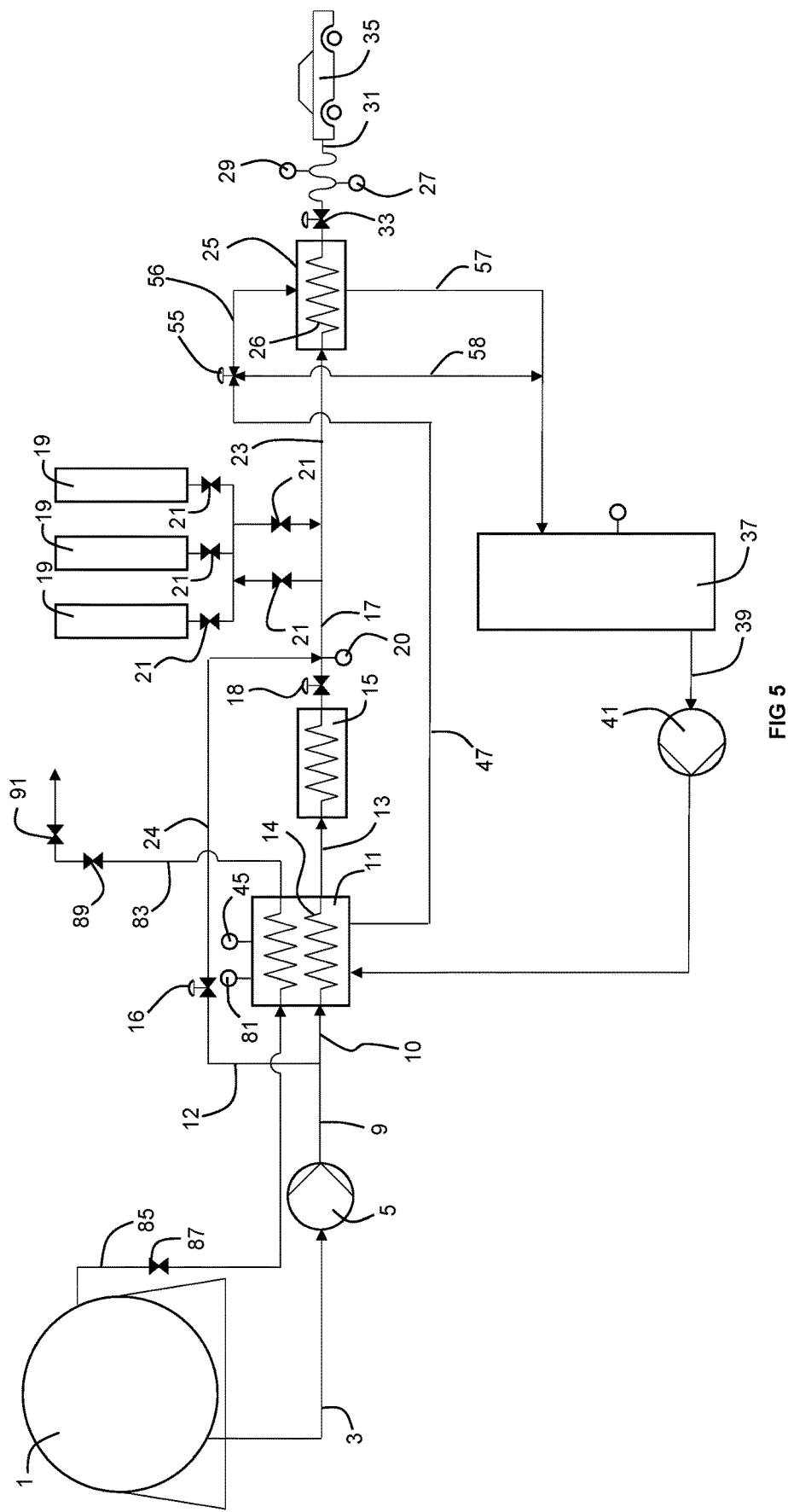
FIG. 5 is a schematic view of a variant of the station and method of FIG. 1.

As best shown in FIG. 5, at least part of a boil-off gas vent line for the storage vessel 1 extends through a second warming circuit of the first heat exchanger 11. A valve 87 and valve 89 may be opened to allow amounts of boil-off gas from the headspace of the storage vessel 1 to flow to the second warming circuit via a headspace feed line 85. The cold boil-off gas transfers frigories to the first heat exchanger 11 as it flows through the warming circuit and is subsequently vented to the ambient atmosphere via gaseous hydrogen line 83 and vent 91.

As best illustrated in FIG. 6, the pumped flow of main HTF 43 may be warmed through heat exchange with ambient air if the temperature of the main HTF is deemed too cold. Based upon a temperature measured by pressure sensor 81, a controller (such as a programmable logic controller or computer that is the same or different from the controller that controls the main HTF pump 41) controls 3-way flow control valves 95', 95". The 3-way flow control valves 95', 99" may be selectively opened to admit at least a portion of a flow of main HTF from main HTF bypass flow 97 and into a main HTF bypass loop 97 that includes a first end in downstream flow communication with the main HTF line 43 and a second end in upstream fluid communication with the main HTF 43. The relatively colder main HTF is warmed by a fan heater 99 that blows ambient air on a heat exchanger section of the fan heater 99. Typically, the fan heater is a fin-fan. A fin-fan is well-known as a type of heat exchanger that moves ambient air over finned tubes in which hot or cold (in comparison to ambient) fluid flows through. The thus-warmed main HTF is then allowed to flow to the cooling circuit of the first heat exchanger 11.

Figure 7:
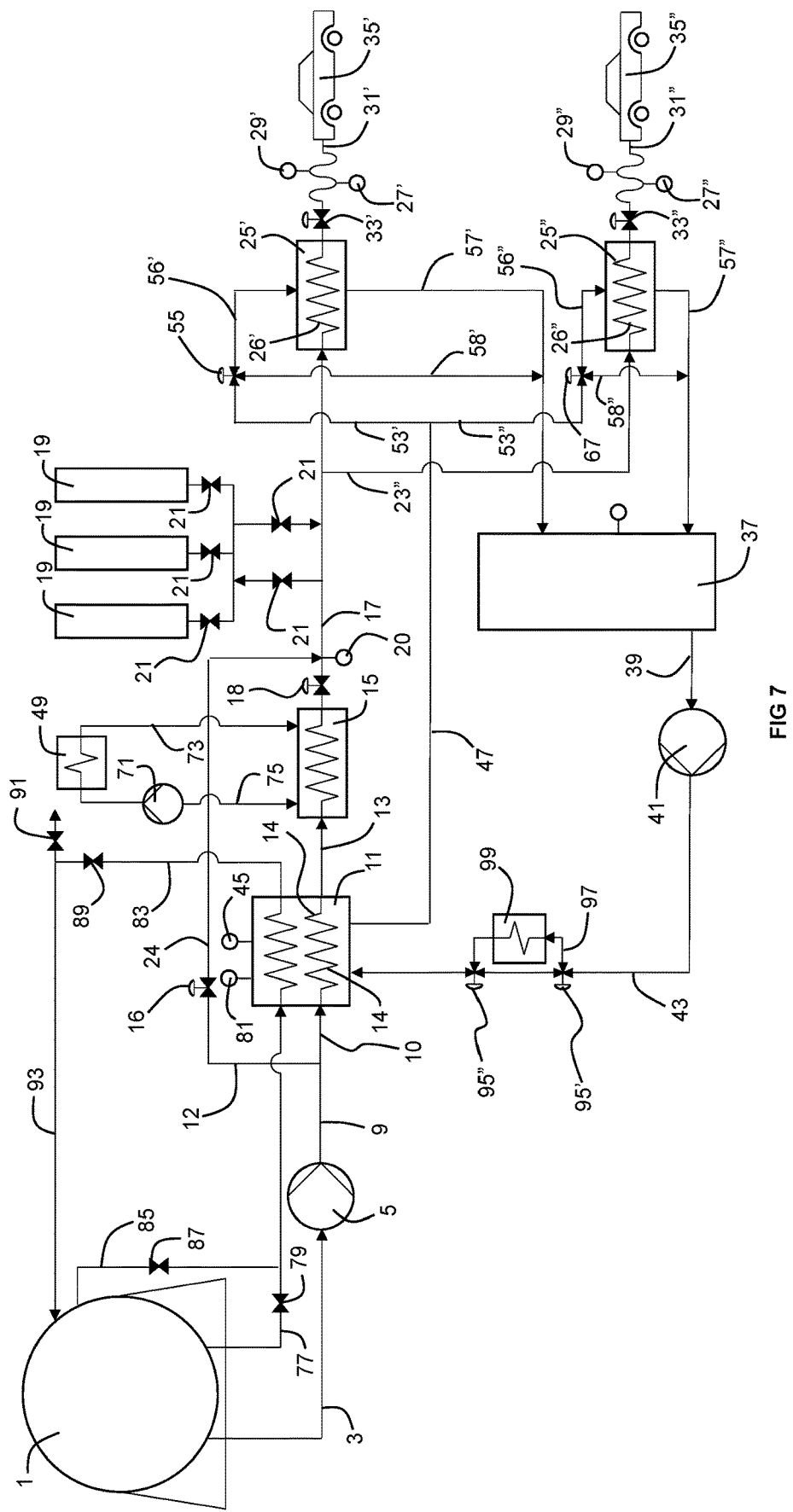
FIG. 7 is a schematic view of a combination of features of the stations and methods of FIGS. 2-6.

As best shown in FIG. 7, each of the features described in FIGS. 2-6 may be integrated into one system.

The invention provides several advantages.

Because the frigories of the liquid hydrogen recovered at the first heat exchanger are used to cool, at the second heat exchanger, the pressurized hydrogen used to fill the tank of the FCEV, the invention does not require an external source of refrigeration.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A system for filling tanks of fuel cell electric vehicles with pressurized hydrogen, comprising:
   a liquid hydrogen storage vessel;
   a liquid hydrogen pump in downstream flow communication from the storage vessel and is adapted and configured to receive a stream of liquid hydrogen from the storage vessel and pump and pressurize the liquid hydrogen stream to produce a stream of pressurized hydrogen;
   a first heat exchanger having a warming circuit that is adapted and configured to receive and vaporize a first portion of the pressurized hydrogen stream therein to produce a vaporized hydrogen stream and also having a cooling circuit;
   a bypass circuit adapted and configured to receive a second portion of the pressurized hydrogen stream from the liquid hydrogen pump;
   a vaporized hydrogen circuit adapted and configured to receive the vaporized hydrogen stream;
   a buffer vessel feed conduit adapted and configured to receive the vaporized hydrogen stream from the vaporized hydrogen circuit and the second portion of the pressurized hydrogen stream from the bypass circuit to form a combined stream;
   a first temperature control valve adapted and configured to control a flow rate of the vaporized hydrogen stream in the vaporized hydrogen circuit;
   a second temperature control valve adapted and configured to control a flow rate of the second portion in the bypass circuit;
   at least one buffer vessel adapted and configured to receive and store the combined stream from said buffer vessel feed conduit until a vehicle tank fill is requested;
   a second heat exchanger having a cooling circuit that is adapted and configured to receive and cool the combined stream from the buffer vessel feed conduit and/or a stream of pressurized hydrogen from the at least one buffer vessel to produce a cooled stream of pressurized hydrogen, the second heat exchanger also having a warming circuit;
   a filling circuit that is comprised of, in flow order, the cooling circuit of the second heat exchanger and at least one filling dispenser that is adapted and configured to engage with a fuel cell electric vehicle so as to allow a tank thereof be filled with the cooled stream of pressurized hydrogen;
   a temperature sensor disposed in the buffer vessel feed conduit that is adapted and configured to measure a temperature of the combined stream;
   a heat exchange fluid loop that is comprised of, in flow order, a surge vessel containing a main heat transfer fluid, a main heat transfer fluid pump adapted and configured to pump the main heat transfer fluid through the heat exchange fluid loop, the cooling circuit of the first heat exchanger, the warming circuit of the second heat exchanger, and the surge vessel, wherein:
   the first heat exchanger is adapted and configured to exchange heat between the relatively warmer main heat transfer fluid with the relatively cooler first portion of the pressurized hydrogen stream to produce the vaporized hydrogen stream and cooled stream of main heat transfer fluid;
   the second heat exchanger is adapted and configured to exchange heat between, on one hand, the relatively warmer combined stream and/or the relatively warmer stream of pressurized hydrogen from the at least one buffer vessel, and on the other hand, the relatively cooler cooled stream of main heat transfer fluid; and
   the first and second temperature control valves control the flow rate of the vaporized hydrogen stream and the second portion, respectively, based upon a temperature measured by said temperature sensor; and
   a boil-off gas venting circuit in flow communication between a headspace of the storage vessel and an ambient atmosphere of the system, the boil off gas venting circuit comprising a first end that is in downstream flow communication with the headspace, a second end that is selectively open to the ambient atmosphere, and a second warming circuit of the first heat exchanger in between the first and second ends, the boil off gas vent circuit being adapted and configured to receive boil off gas from the headspace, warm the received boil off gas in the second warming circuit through heat exchange with a mass of the first heat exchanger, and vent the warmed boil off gas to the ambient atmosphere via the second end.

2. The system of claim 1, wherein the at least one filling dispenser comprises first and second filling dispensers each one of which is adapted and configured to engage with a respective fuel cell electric vehicle so as to allow an associated tank thereof be filled with pressurized hydrogen, the filling circuit branching into a first split-stream adapted and configured to feed pressurized hydrogen from the at least one buffer vessel to the first filling dispenser and a second split-stream adapted and configured to feed pressurized hydrogen from the at least one buffer vessel to the second filling dispenser.

3. The system of claim 1, further comprising an auxiliary heat transfer pump and an auxiliary heat exchanger that comprises a warming circuit that is in flow communication between the warming circuit of said first heat exchanger and the buffer vessel feed conduit, wherein:
    an auxiliary heat transfer circuit is formed from the cooling circuit of the auxiliary heat exchanger and the auxiliary heat transfer pump;
    the auxiliary heat transfer circuit is adapted and configured to circulate an auxiliary heat transfer fluid from the auxiliary heat transfer pump, through the cooling circuit of the auxiliary heat transfer circuit and back to the auxiliary heat transfer pump; and
    the auxiliary heat exchanger is a tube-in-tube heat exchanger comprising an inner tube concentrically disposed within an outer tube, the warming circuit of the auxiliary heat exchanger being the inner tube and the cooling circuit of the auxiliary heat exchanger being the outer tube.

4. The system of claim 1, further comprising a pressure building circuit in flow communication between a liquid hydrogen storage area of the storage vessel and a headspace of the storage vessel, the pressure building circuit being adapted and configured to receive a stream of liquid hydrogen from the liquid hydrogen space of the storage vessel, vaporize, in a second warming circuit of said first heat exchanger, the stream of liquid hydrogen received from the storage vessel through heat exchange with a mass of the heat exchanger, and return the vaporized liquid hydrogen to the headspace so as to build a pressure therein.

5. The system of claim 1, further comprising:
    a main heat transfer line in fluid communication between the main heat transfer fluid pump and the cooling circuit of the first heat exchanger;
    a main heat transfer fluid bypass loop having a first end in downstream fluid communication with the main heat transfer fluid line, a second end in upstream fluid communication with the main heat transfer fluid line, and a heat exchanger section therebetween; and
    a fan heater adapted and configured to blow ambient air upon the heat exchange section to warm a pumped flow of the main transfer fluid before the pumped flow of the main heat transfer fluid is cooled at the first heat exchanger.

6. The system of claim 1, wherein the first heat exchanger comprises a mass of metal formed by high-temperature casting in liquid form around the warming and cooling circuits thereof.

7. The system of claim 1, further comprising:
    a pressure sensor and a temperature sensor each disposed in the filling circuit that are adapted and configured to measure a pressure and a temperature, respectively, of the cooled stream of pressurized hydrogen received from the second heat exchanger; and
    a pressure control valve disposed in the filling circuit that is adapted and configured to control a pressure of the cooled stream of pressurized hydrogen used to fill a tank of a fuel cell electric vehicle, wherein operation of the pressure control valve is based upon the pressure and temperature measured by the pressure and temperature sensors.

8. A method for filling tanks of fuel cell electric vehicles with pressurized hydrogen, comprising the steps of:
    providing the system of claim 1;
    pumping liquid hydrogen from the liquid hydrogen storage vessel with the liquid hydrogen pump to produce a stream of pressurized hydrogen;
    pumping a flow of main heat transfer fluid, with the main heat transfer fluid pump, in the heat exchange fluid loop;
    dividing the stream of pressurized hydrogen into first and second portions;
    vaporizing the first portion in the warming circuit of the first heat exchanger and cooling the flow of main heat transfer fluid in the cooling circuit of the first heat exchanger through heat exchange therebetween to produce a stream of vaporized hydrogen and cooled flow of main heat transfer fluid;
    receiving the vaporized hydrogen stream into the vaporized hydrogen circuit;
    receiving the second portion into the bypass circuit;
    receiving, into the buffer vessel feed conduit, a combined stream comprised of the vaporized hydrogen stream and the second portion from the vaporized hydrogen circuit;
    receiving and storing, in the at least one buffer vessel, the combined stream until a fill of a vehicle tank is requested;
    when a vehicle tank fill is requested, cooling the combined stream from the buffer vessel feed conduit and/or a stream of pressurized hydrogen from the at least one buffer vessel in the cooling circuit of the second heat exchanger and warming the cooled flow of main heat transfer fluid in the warming circuit of the second heat exchanger through heat exchange therebetween to produce a cooled stream of pressurized hydrogen and warmed flow of main heat transfer fluid;
    measuring a temperature, with the temperature sensor, of the combined stream in the buffer vessel feed conduit;
    controlling the flow rates or pressures of the vaporized hydrogen stream and the second portion with the first and second temperature control valves, respectively, based upon a temperature sensed by the temperature sensor;
    filling the vehicle tank with the cooled stream of pressurized hydrogen;
    feeding a stream of gaseous hydrogen from a headspace of the storage vessel to a second warming circuit of the first heat exchanger; and
    vaporizing the fed stream of liquid hydrogen in a second warming circuit of the first heat exchanger, and venting the vaporized liquid hydrogen to the ambient atmosphere.

9. The method of claim 8, further comprising the steps of:
    pumping, with said auxiliary heat transfer pump, an auxiliary heat transfer fluid in an auxiliary heat exchange circuit to produce a recirculating flow of the auxiliary heat transfer fluid; and
    warming, in the warming circuit of said auxiliary heat exchanger, the stream of vaporized hydrogen and cooling, in the cooling circuit of the auxiliary heat exchanger, the recirculating flow of the auxiliary heat transfer fluid through heat exchange between the stream of vaporized hydrogen and the recirculating flow of the auxiliary heat transfer fluid.

10. The method of claim 8, further comprising the steps of:
- feeding a stream of liquid hydrogen from the storage vessel to a second warming circuit of the first heat exchanger;
- vaporizing the fed stream of liquid hydrogen in the second warming circuit of the first heat exchanger through heat exchange with a mass of the first heat exchanger to produce a stream of vaporized liquid hydrogen; and
- returning the stream of vaporized liquid hydrogen to a headspace of the storage vessel thereby increasing a pressure thereof.

* * * * *